(12) United States Patent
Guillemaut

(10) Patent No.: US 8,708,281 B2
(45) Date of Patent: Apr. 29, 2014

(54) METHOD OF SLOWING THE PROPAGATION OF CRACKS IN A FAIL SAFE STRUCTURE AND FAIL SAFE FRAME, ESPECIALLY FOR FUSELAGE

(75) Inventor: Julien Guillemaut, Madrid (ES)

(73) Assignee: Airbus Operations (SAS), Toulouse Cedex (FR)

( * ) Notice: Subject to any disclaimer, the term of this patent is extended or adjusted under 35 U.S.C. 154(b) by 123 days.

(21) Appl. No.: 13/439,220

(22) Filed: Apr. 4, 2012

(65) Prior Publication Data

US 2012/0255258 A1  Oct. 11, 2012

(30) Foreign Application Priority Data

Apr. 5, 2011  (FR) ........................................ 11 52922

(51) Int. Cl.
*B64C 1/06*  (2006.01)
(52) U.S. Cl.
USPC ......................... 244/131; 244/132; 52/783.14
(58) Field of Classification Search
USPC .................. 244/131, 132, 123.12; 52/783.14, 52/783.15, 787.12, 630, 309.14
See application file for complete search history.

(56) References Cited

U.S. PATENT DOCUMENTS

| | | | | |
|---|---|---|---|---|
| 183,160 | A * | 10/1876 | Haughian | 428/598 |
| 5,098,011 | A | 3/1992 | Runyan | |
| 5,476,704 | A * | 12/1995 | Kohler | 428/119 |
| 6,543,721 | B2 * | 4/2003 | Palm | 244/117 R |
| 6,712,315 | B2 * | 3/2004 | Schmidt et al. | 244/117 R |
| 7,197,852 | B2 * | 4/2007 | Grillos | 52/144 |
| 7,325,771 | B2 * | 2/2008 | Stulc et al. | 244/119 |
| 8,096,092 | B2 * | 1/2012 | Vichniakov | 52/588.1 |
| 8,511,130 | B2 * | 8/2013 | Prevey, III | 72/377 |
| 2005/0247818 | A1 | 11/2005 | Prichard et al. | |
| 2007/0277470 | A1 | 12/2007 | Vichniakov | |
| 2011/0215202 | A1 * | 9/2011 | Rhoden et al. | 244/131 |

FOREIGN PATENT DOCUMENTS

| | | |
|---|---|---|
| GB | 125748 | 4/1919 |
| GB | 1497155 | 1/1978 |

OTHER PUBLICATIONS

Vogelsang L B et al: "ARALL: A Materials challenge for the Next Generation of Aircraft," Materials and Design, London, GB, vol. 7, No. 6, Nov. 1, 1986.
French Patent Office, Preliminary Search Report for FR 1152922, Nov. 15, 2011 (2 pgs.): French language Written Opinion (5 pgs.).

* cited by examiner

*Primary Examiner* — Christopher P Ellis
(74) *Attorney, Agent, or Firm* — Wood, Herron & Evans, LLP

(57) ABSTRACT

The invention seeks to improve the integrity in respect of tolerance to damage following the spread of cracks in failure-mitigating structures of the failsafe type. To do this, the invention proposes to form a composite hybrid structure within the failure-mitigating structure. A failure-mitigating mainframe, particularly of an aircraft fuselage, equipped with a structural element made of composite according to the invention, has profiled longitudinal structural components assembled back to back by fasteners. First sides are longitudinally aligned and bonded to the fuselage skin, and the other sides are longitudinally aligned some distance away from the first sides. Fasteners couple the composite structural element to the external face of the sides of the metal components that are longitudinally aligned some distance away from the first sides.

8 Claims, 2 Drawing Sheets

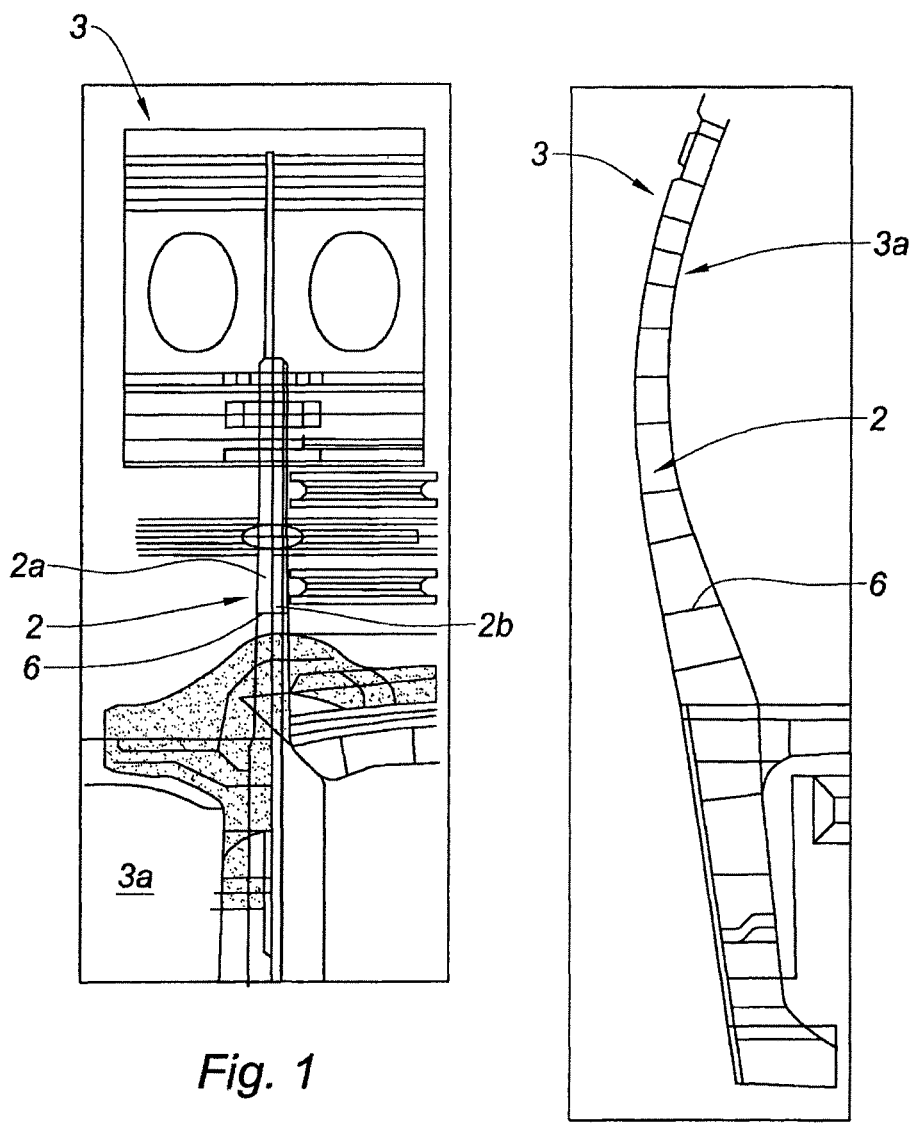

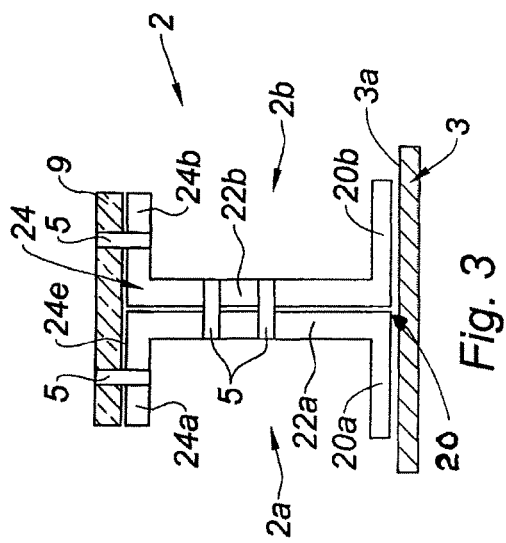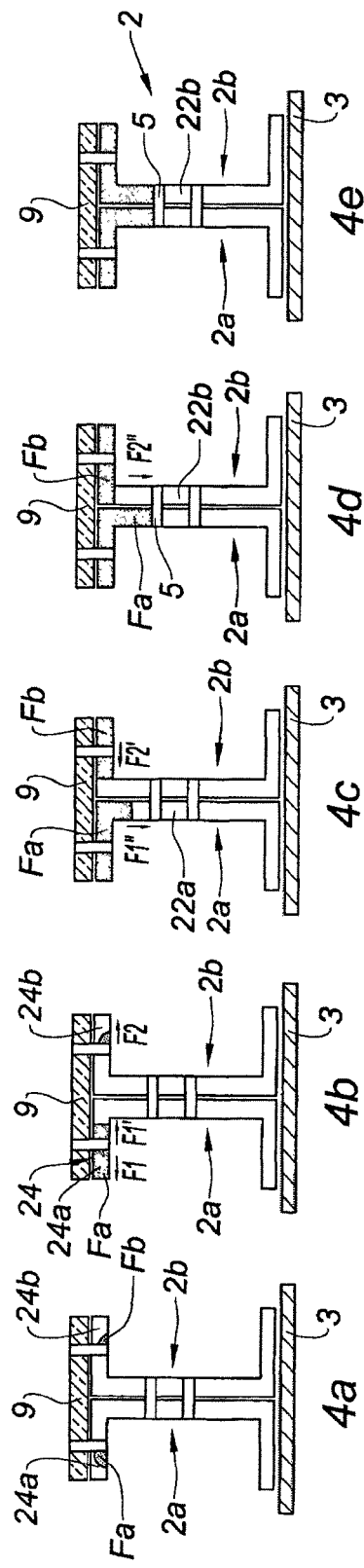

METHOD OF SLOWING THE PROPAGATION OF CRACKS IN A FAIL SAFE STRUCTURE AND FAIL SAFE FRAME, ESPECIALLY FOR FUSELAGE

TECHNICAL FIELD

The invention relates to a method for slowing the spread of cracks in a failure-mitigating structure, which means a structure having multiple paths along which load can be reacted. The invention also relates to a mainframe of an aircraft fuselage capable of implementing this method.

BACKGROUND

In general, a structure is said to be failure-mitigating or, more specifically, fail safe when there are several possible paths along which load can be reacted. In particular, a failure-mitigating structure may be made up of two longitudinal metal components assembled with one another to act as a reinforced frame, known as the "mainframe" of an aircraft fuselage. Because of the extreme magnitude of the loads applied, and because of the difficulties connected with manufacture, these frames are generally made of metal.

For such a mainframe to be certified both of its two components have to have mechanical integrity at 150% of the maximum possible loads encountered in the life of the aircraft (loads known as "ultimate loads"). When one of the two components is assumed to have broken, the mechanical integrity at 100% of the maximum load applied in the life of the aircraft (loads known as "limit loads") has to be demonstrated.

Because fuselage mainframes are made of metal, the main criterion governing the sizing of these frames is generally their ability to tolerate damage. This is because certification demands that the largest crack that has remained undetected in a first inspection must not be able to grow to the critical size—defined as being able to destroy the structure—during the interval of time separating the first inspection from the next inspection.

In order to measure the damage tolerance of a fuselage mainframe, it is agreed practice to use a crack spread model that allows the size of the crack or cracks to be assessed as a function of the number of flights made. The initial conditions generally considered for a structure of the failsafe frame type generally consist in considering cracks of different sizes on each of the components of the failsafe frame. The cracks are formed on the two assembled components of the frame and then spread at rates that are proportional to the initial size of the cracks. When a crack has reached the critical rupture size, the corresponding component is broken and the other component finds itself overloaded because of the redistribution of load from the broken frame into the other frame, and into the skin of the fuselage. The order of magnitude of the overload experienced by the remaining frame is around 80%. This therefore corresponds to what is known as an overall redistribution of load. The spread of the crack through the unbroken frame is then very rapid. The interval between two inspections has therefore to be determined by the component sizing criterion.

PRIOR ART

In general, means for improving the integrity of metal structures of the failure-mitigating type in terms of their tolerance to damage, i.e. the spread of cracks, are therefore sought.

Moreover, patent document US 2010/0316857 discloses a multilayer composite incorporating a metal reinforcing layer. Such a material is intended to be used in force insertion zones, for example screws or rivets, or connecting zones. It is therefore restricted to cracks which originate in these specific zones, for which protection is generally provided.

In order to limit the spread of cracks, the conventional solutions involve increasing the size and/or increasing the number of connecting beams. These solutions are expensive and add mass to the frame.

SUMMARY OF THE INVENTION

The invention seeks to improve integrity in terms of tolerance to damage following the spread of cracks in failure-mitigating structures of the failsafe type while introducing either a weight saving or an increase in the time between two inspections of the structure of the same weight.

To do this, the invention proposes to form a composite hybrid structure in the failure-mitigating structure.

More specifically, the subject of the present invention is a method for preventing the spread of cracks in a failure-mitigating structure comprising at least two metal components. In this method, at least one structural element made of composite is connected to the metal components in a break repairing configuration involving an overall redistribution of mechanical load in the other components of the structure so that the load borne by the cracked component is transmitted through this component only in line with the crack. The redistribution of load is said to be a local one.

According to specific embodiments:
  the structural element is held against the metal components which are coupled together to form a mainframe;
  the structural element extends over the entire length of the metal components.

The invention also relates to a failure-mitigating mainframe equipped with a structural element made of composite according to the above method. This frame has profiled longitudinal structural components assembled back to back by fasteners, so that first sides are longitudinally aligned, bonded to the fuselage skin, and the other sides are longitudinally aligned some distance away from the first sides. Fasteners couple the composite structural element to the external face of the sides of the metal components that are longitudinally aligned some distance away from the first sides.

According to some preferred embodiments:
  The longitudinal components are profiled structures chosen from a U-section, an I-section (the Roman numeral shape of "I") and a T-section;
  the metal components are two in number;
  the material of the metal components is based on a aluminium or titanium alloy;
  the structural composite element forms a longitudinal fish plate which covers the entire extent of the external faces of the sides of the metal components that are aligned longitudinally some distance away from the first sides;
  the composite structural element is connected to the external faces by a securing means chosen between bonding using an epoxy resin, using a layer which is polymerized by radiation and/or by the release of heat.

BRIEF DESCRIPTION OF THE DRAWINGS
INTRODUCTION TO THE FIGURES

Other aspects and advantages of the present invention will become apparent on reading the detailed description which follows, with reference to the attached figures which respectively depict:

FIG. 1 is a partial view from the inside of an aircraft fuselage on which a mainframe is longitudinally mounted;

FIG. 2 is a partial view from the rear of the aircraft fuselage of FIG. 1, showing the mainframe;

FIG. 3 is a schematic view in cross section of one example of a mainframe for use with the aircraft fuselage of FIG. 1, and FIG. 4 includes FIGS. 4a through 4e as follows:

FIG. 4a is a cross-sectional view of the mainframe of FIG. 3, through which initiated cracks are present;

FIG. 4b is a cross-sectional view of the mainframe of FIG. 4a through which the initiated cracks have begun to spread in a first longeron;

FIG. 4c is a cross-sectional view of the mainframe of FIG. 4b through which the initiated cracks have begun to spread further in the first longeron and also in a second longeron;

FIG. 4d is a cross-sectional view of the mainframe of FIG. 4c through which the initiated cracks have spread further in the first and second longerons and the first longeron has failed;

FIG. 4e is a cross-sectional view of the mainframe of FIG. 4d through which the initiated cracks have spread further in the second longeron and the second longeron has failed.

DETAILED DESCRIPTION

Throughout the text, the qualifiers "internal" and its derivatives or "external" and its derivatives relate, respectively, to elements which are closer to or further away from the fuselage skin and, respectively, to elements facing toward or away from this fuselage skin. Moreover, the same reference symbols in the attached figures denote elements that are identical.

With reference to the frontal and rear views of FIGS. 1 and 2, a failure-mitigating frame 2 comprises two metal components 2a and 2b in the form of longerons (for example C-sections) which are substantially identical and fixed to a fuselage skin 3. The longerons may be bonded or co-bonded, which means annealed with the fuselage, and fastened by riveting, welding or the equivalent to the internal face 3a of the skin 3. The longerons are held together by fasteners distributed along their entire length. Webs 6 are also distributed along their entire length in order to provide mechanical stability. The assembly of these two metal components 2a and 2b thus assembled forms a failure-mitigating frame 2 of the failsafe type.

For further detail, and with reference to the cross section of FIG. 3, each longeron 2a and 2b of the mainframe 2 comprises:
- an inner half-sole or foot 20a, 20b, bonded and bolted (the bolts are not depicted) to the internal face 3a of the fuselage skin 3;
- a web 22a, 22b which runs substantially perpendicular to the respective half-soles 20a, 20b and to the skin 3, and
- a half-heel 24a, 24b which runs parallel to the inner half-soles 20a, 20b over a width which is slightly less than that of these inner half-soles.

The metal longerons 2a and 2b are, for example, made of an alloy of aluminium or titanium and are joined together by metal fasteners 5 along their webs 22a, 22b. These longerons are therefore assembled "back to back" and in cross section have the shape of a U, the sides of which are formed by the inner half-soles 20a, 20b, and the half-heels 24a, 24b flanking the base of the U that is formed by the webs 22a, 22b.

The inner half-soles 20a and 20b form the sole 20 of the frame 2 and the two half-heels 24a and 24b form a heel 24 for a fish plate made of carbon fibre reinforced composite 9. This material is based on a polymer (generally epoxy resin) reinforced with carbon fibre, and known for example by the name CFRP (which stands for "Carbon Fibre Reinforced Polymer").

This fish plate 9 is laid along the external face 24e of the heel 24 and assembled thereto by metallic fasteners 5. Alternatively or in addition, the fish plate is bonded to the face 24e by any known means, for example by hot melt using an inserted epoxy resin or by UV radiation using an appropriate resin. The fish plate 9 and the heel 24 have similar or nearly the same widths.

The frame 2 thus has a hybrid structure through the addition of the composite fish plate. This addition makes it possible to avoid an overall redistribution of mechanical load in one of the metal components 2a, 2b. Stopping this redistribution of load makes it possible to slow the spread of a crack through one of the components 2b when a crack is still spreading in the other component 2a (and vice versa). Indeed it would appear that a simple local transfer of load occurs, in line with the crack Fa in the component 2a, thanks to the presence of the composite fish plate 9. The spreads of the cracks are illustrated hereinafter in the diagrams of FIG. 4 (FIGS. 4a through 4e) which analyze and visually represent the tolerance to damage.

With reference to FIG. 4a, cracks Fa and Fb are started simultaneously in the longerons 2a and 2b at the respective points where the outer half-soles 24a, 24b are assembled with the composite fish plate 9. On initiation, the first crack Fa exhibits a surface defect of a size greater than that of the second crack Fb. In the example, cracks Fa and Fb have respective depths of 1.27 mm and 0.127 mm and are thus related by a factor of ten.

FIG. 4b illustrates the spread of the two cracks. Crack Fb, which is initially of a smaller size, does not spread as quickly as crack Fa of greater initial size. The cracks spread through the half-heels 24a and 24b, in opposite directions F1 and F2. When crack Fa reaches the edge of the heel 24 it then spreads in the direction F1', initially parallel to F2, then in the direction F1' toward the web 22a (FIG. 4c). The same is true of the directions F2 and F'T in which crack Fb spreads.

Crack Fa then spreads as far as the fastener 5 of the web 22a or even reaches a critical size: it may then be assumed that the first longeron 2a has broken (FIG. 4d). However, the second longeron 2b does not find itself correspondingly overloaded because the composite fish plate 9 behaves like a "repair" strap allowing the load transmitted through the crack Fa to be transferred locally, just upstream and downstream of crack Fa. Thus, there is no overall redistribution of load resulting from the first crack Fa onto the other longeron 2b and, in particular, onto the other crack Fb and the spread of this crack Fb does not experience an increase in speed.

Crack Fb of the second longeron 2b also spreads (arrow F2", FIG. 4d) as far as the fastener 5 of the web 22b of the longeron 2b (FIG. 4e). At that moment it is assumed that the frame 2 breaks overall, even though the composite fish plate 9 may maintain a certain ability to absorb load depending on its design.

Once the longeron 2a is considered to have broken, crack Fb has nonetheless spread without additional load because, as described with reference to FIG. 4d, no overall distribution of load has taken place. Crack Fb has therefore been able to spread appreciably more slowly than it would have if, through overall redistribution of load in the absence of a composite fish plate 9, the second longeron 2b had become overloaded (by approximately 80% through the redistribution of load in the example given). The tolerance to damage, as measured by the speed at which cracks spread and the definition of the inspection intervals has thus been appreciably increased.

This solution is therefore an opportunity to save longeron weight for the same inspection intervals, or to increase the inspection intervals for the same longeron weight. The increase in weight caused by the presence of the composite fish plate 9 is low because of its density (around 1.8 g/cm$^3$) compared with that of metallic materials (around 4.5 g/cm$^3$ for the titanium alloy "Ti$_6$Al$_4$V", for example).

The invention is not restricted to the embodiments described and depicted. It is for example possible for the longerons to be more than two in number, assembled in pairs. The longerons may also have varying profiles in cross section, being I-sections, T-sections, etc. Moreover, the composite fish plate may be of curved shape in cross section, for example able to cover the ends of the heels of the longerons. It may be laid on parts other than the heels: on lateral parts or between the skin and the soles of the longerons.

The invention claimed is:

1. A method for slowing the spread of cracks in a failure-mitigating structure comprising:
    providing the failure mitigating structure with at least two longitudinal structural components in the form of U-shaped metal components with webs assembled back to back with fasteners, first sides longitudinally aligned and configured to be connected to a fuselage skin of an aircraft, and second sides longitudinally aligned to form a heel spaced a distance away from the first sides, and
    using fasteners to join at least one structural element made of composite to the heel formed by the metal components coupled together by fasteners in order to form a mainframe in a break repairing configuration in which a load borne by a cracked longitudinal structural component is transferred locally into the structural element made of composite and is not redistributed throughout all other components of the mainframe, thereby avoiding acceleration of any other cracks in other components of the mainframe.

2. The method of slowing the spread of cracks according to claim 1, wherein the structural element made of composite extends over an entire length of the metal components.

3. A failure mitigating mainframe configured to be connected to a fuselage skin of an aircraft and to slow a spread of cracks in the mainframe, comprising:
    profiled longitudinal structural components assembled back to back by fasteners, the longitudinal structural components including first sides that are longitudinally aligned with one another and bonded to the fuselage skin, and second the other sides that are longitudinally aligned with one another and spaced a distance away from the first sides, the second sides defining an external face of the longitudinal structural components; and
    a structural element made of composite and coupled with fasteners to the external face of the longitudinal structural components so as to provide the mainframe in a break repairing configuration in which a load borne by a cracked longitudinal structural component is transferred locally into the structural element made of composite and is not redistributed throughout all other components of the mainframe, thereby avoiding acceleration of any other cracks in other components of the mainframe.

4. The failure mitigating mainframe according to claim 3, wherein the longitudinal structural components include profiled structures chosen from a U-section, an I section, and a T-section.

5. The failure mitigating mainframe according to claim 3, wherein the metal components are two in number.

6. The failure mitigating mainframe according to claim 3, wherein the material of the metal components is based on a titanium alloy.

7. The failure mitigating mainframe according to claim 3, wherein the structural element made of composite forms a longitudinal fish plate which covers an entire extent of the external face.

8. The failure mitigating mainframe according to claim 3, wherein the structural element made of composite is connected to the external face by at least one of a securing means chosen between bonding using an epoxy resin, and using a layer which is polymerized by radiation and/or by the release of heat.

* * * * *